2,890,098
REDUCTION OF PLUTONIUM VALUES IN AN ACIDIC AQUEOUS SOLUTION WITH FORMALDEHYDE

Carl M. Olson, Newark, Del., assignor to the United States of America as represented by the United States Atomic Energy Commission No Drawing. Application January 24, 1950
Serial No. 140,349

2 Claims. (Cl. 23—14.5)

This invention relates to an improvement in processes for isolation of plutonium from aqueous solutions, and more particularly relates to a method for the preparation of aqueous nitric acid solutions containing uranium, plutonium and associated fission product values wherein said aqueous solutions and the contained plutonium values are well-adapted to further processing for separation and isolation of plutonium therefrom.

Plutonium is usually formed by the neutron irradiation of a uranium mass. This mass is then dissolved in an acid solution such as nitric acid. This solution will then contain the uranium, plutonium, and all of the other products of the neutron bombardment including radioactive fission products.

It is generally necessary to use an excess of concentrated nitric acid in order to obtain a practical rate of solution of the uranium. After the neutron irradiated uranium metal has been dissolved, however, it has been found that the presence of an excess of nitric acid interferes with the recovery of plutonium. Thus, if plutonium is removed from solution by adsorption on organic adsorbents, the presence of excess concentrated nitric acid seriously reduces the efficiency of the process and may even destroy the adsorbent.

In addition, the process of dissolving the bombarded uranium in concentrated nitric acid on a commercial scale oxidizes a substantial portion of the plutonium to its higher oxidation state. The most commonly used plutonium recovery method, namely, by bismuth phosphate precipitation, does not work efficiently with plutonium in its higher state of oxidation or in the presence of excess nitric acid owing to the solubility of bismuth phosphate therein. Accordingly, it is necessary to both remove the excess nitric acid and reduce the plutonium to its lower valence state.

This excess of acid can be removed by neutralization with various bases but this introduces additional foreign ions into the solution. The deleterious effects of excess nitric acid can also be effectively avoided by lowering the concentration thereof to such an extent that it does not interfere with the recovery processes. Such dilution, however, is undesirable since it increases the total volume of material to be handled to an impractically large degree.

The oxidized plutonium can be reduced by means of a number of specific reducing agents such as ferrous ion, uranous ion, and the like. These reducing agents, however, introduce foreign elements that must themselves be removed before plutonium can be recovered in pure form.

It is an object of the present invention to provide a method whereby the amount of excess acidity present in plutonium-containing aqueous solutions can be reduced and to provide a method for reducing the plutonium values therein to a tetravalent state which favors subsequent separation of said plutonium values from uranium and other contaminating metal values with which plutonium is usually associated in these aqueous nitric acid solutions.

It is a further object of this invention to provide a method whereby plutonium ions can be reduced from a higher valence to the tetravalent state by means of a single reagent which also reduces the acid concentration in the plutonium-containing solution undergoing treatment.

It is a further object of this invention to provide a method for reducing the free acid concentration of plutonium-containing solutions without adding thereto additional ions which would further contaminate said plutonium-containing solutions and necessitate removal of such contaminants either before, during or subsequent to the isolation of plutonium therefrom.

I have discovered that the adverse effects, namely, high hydrogen ion concentrations and excessive oxidation of plutonium values caused by the presence of excess nitric acid in plutonium-containing nitric acid solutions, are avoided by the introduction therein of an organic substance containing an aldehyde group, which substance is reactive with nitric acid to produce volatile oxides of nitrogen, oxides of carbon and water. Destruction and removal of nitric acid from aqueous solutions as practiced in accordance with this invention is effected chiefly by the aldehyde group and preferably by a simple aldehyde such as formaldehyde, water-soluble polymers thereof such as meta-formaldehyde, para-formaldehyde; acetaldehyde, and propionaldehyde. Formaldehyde is most advantageously used since the oxidation products of formaldehyde are volatile gases. Therefore, by introducing formaldehyde in a sufficient quantity into a nitric acid solution containing plutonium values the formaldehyde is oxidized to formic acid and by subsequently digesting the nitric acid-formic acid mixture at the boiling point of the hexavalent metal nitrate solution undergoing treatment, the nitric acid and formic acid are decomposed to oxides of nitrogen and water, and oxides of carbon and water, respectively. The gases formed during such reaction are readily evolved from the aqueous solution. Presumably, the reaction (or reactions) takes place in accordance with one or more of the following equations either singly or in combination.

$$2HNO_3 + 3CH_2O \rightarrow 3HCOOH + 2NO + H_2O$$

and $$3HCOOH + 2HNO_3 \rightarrow 2NO + 3CO_2 + 4H_2O$$

and/or $$2HNO_3 + HCHO \rightarrow CO_2 + 2H_2O + NO + NO_2$$

By introducing formaldehyde into the plutonium-containing nitric acid solution the acidity in said solution is substantially reduced without introducing further impurities such as those introduced by the employment of more conventional neutralization processes. In addition to decreasing the acidity, I have further discovered that by introducing sufficient formaldehyde into the plutonium-containing nitric acid solutions, the hexavalent plutonium values are reduced to a valence state not in excess of the tetravalent.

Generally nitric acid solutions containing plutonium and uranium values contain these metals in the form of their plutonly or uranyl nitrates, and upon addition of formaldehyde thereto, the rate of reaction between the formaldehyde and the nitrate ions in solution varies directly with the concentration of the nitrate ion. The amount of formaldehyde necessary to effect a substantial reduction of the nitric acid concentration in such a solution varies inversely with the concentration of uranyl values (and associated plutonyl values) in the original solution. Where the concentration of the hexavalent metal nitrate in the untreated solution is of the order of at least 70% or better and heated to its boiling point, the formaldehyde is added in amounts sufficient to provide, upon oxidation thereof, formic acid in a concentration equimolar with the nitric acid concentration of the original solution. In solutions containing at least 70% uranyl nitrate the reaction proceeds vigorously which perhaps can be attributed to the evolution of $NO_2$ upon the partial reduction of the nitric acid with formaldehyde and/or the first oxidation product of formaldehyde according to the following reaction $$2HNO_3 + HCHO \rightarrow CO_2 + 2H_2O + NO + NO_2$$

A less vigorous but still rapid reaction takes place where the concentration of the metal nitrate in the original untreated solution is of the order of 35 to 50%, which solution at its boiling point, requires sufficient formaldehyde to provide a formic acid to nitric acid ratio of approximately 1.5:1. Possibly this reaction proceeds according to the reactions shown below wherein only the lower oxide of nitrogen is formed upon reduction of nitric acid with formaldehyde $$3HNO_3 + 2HCHO \rightarrow 2NO + H_2O + 3HCOOH$$

and which reaction is followed by:

$$3HCOOH + 2HNO_3 \rightarrow 3CO_2 + 4H_2O + 2NO$$

If the concentration of the metal nitrate in the solution to be treated is of the order of only 20% it is necessary to add formaldehyde to the boiling solution in an amount sufficient to provide only 1 mole of formic acid per one mole of nitric acid, but the nitric acid concentration is thereby reduced only to the extent of about 20%. At temperatures in the vicinity of 98° C., formaldehyde is driven off from the aqueous solution and a certain decreased yield of the reduced plutonium values is obtained thereby, while at temperatures of 75° C. the reaction rate is more moderate. The preferred temperature range for effecting the reaction involved in the process of this invention is between 80 to 90° C. Within this latter temperature range, optimum results are obtained with respect to the rate for the entire reaction and the yield of plutonium in the tetravalent state.

In order to avoid excessive evolution of gases as a result of this reaction of nitric acid with formaldehyde, the theoretical amount of formaldehyde necessary for the entire reaction should be divided by a factor of about 3 and only ⅓ of the theoretical amount is added initially and addition of the remaining portions is subsequently made during the total reaction time which usually varies between 1 to 2 hours, depending upon the original acid concentration of solutions undergoing treatment which in turn influences the temperature necessary to reach the boiling point of the original solution. The reaction mixture is suitably digested with formaldehyde or derivatives thereof at the respective boiling points for the untreated acid solutions containing hexavalent salt, which temperatures vary usually between 70–95° C., the reaction rate varying directly with the temperature.

Factors such as the size of the reaction vessel, the composition of the reaction vessel, the depth from the surface of the solution at which formaldehyde is introduced and the degree or the extent of agitation or aeration of the solution during the reaction also affect the rate and the extent of the reaction within the solution resulting from the introduction of formaldehyde into nitric acid solutions containing plutonyl and uranyl nitrate.

In accordance with a further embodiment of this invention, I have discovered that the presence of sulphuric or phosphoric acid in the aqueous metal-nitrate-containing solutions reacting with the formic acid (provided by the reduction of nitric acid with formaldehyde) increases the reaction rate both for reduction of the nitric acid concentration and reduction in the valence of the plutonium values contained therein as well as increasing the yield of plutonium obtained in the tetravalent state. The sulphuric or phosphoric acid is added preferably to the plutonium-containing nitric acid solution prior to the introduction of formaldehyde therein. The formaldehyde is subsequently introduced into the resultant mixed acid solution at a point well below the liquid surface thereof.

The example following illustrates the process of the present invention and the relatively wide range of conditions under which the described process is operative.

*Example 1*

The use of formaldehyde as a reducing agent for plutonium as well as a reductant for excess nitric acid contained in solutions of neutron-bombarded uranyl nitrate is illustrated by the following test:

Experiments were carried out in glass vessels in order to avoid any possible reduction owing to conditions extraneous to those exerted by the reagents themselves.

Test solutions were prepared from nitric acid solutions containing uranyl nitrate hexahydrate made up to a 50% solution and containing added oxidized plutonium to the extent of 118.5 alpha counts per minute per gram of uranyl nitrate hexahydrate as detected by a Geiger-Mueller counter. The valence of 97.8% of the added plutonium was in excess of the tetravalent.

To each of three aliquot portions of the above described test solutions, each of which contain 50% uranyl nitrate and up to 5.5% nitric acid with excess acidity equivalent to 0.1 N and 0.4 N at 20% uranyl nitrate hexahydrate, formaldehyde was added in amounts sufficient to effect a formaldehyde-nitric acid molar ratio range from 0.375:1 to 1.5:1. In all three cases the formaldehyde was added at a constant rate and introduced at a point below the surface of the boiling uranyl nitrate solution. The time allowed for addition of the formaldehyde ranged between 0.5 and 2.0 hours and in each case a boiling period of one hour followed the addition of formaldehyde. Following the above-described treatment, residual acidity in the treated solutions was found between 0.03 N and 0.34 N and in all cases at least 96% of the oxidized plutonium originally present was reduced to a valence state not in excess of the tetravalent.

The reduced plutonium was removed from the test solutions by carrier precipitation using bismuth phosphate in accordance with a now well-known process. Each of the two remaining samples of the solutions treated as described above were separately contacted with adsorption columns. One column was filled with columbic oxide and the adsorbent in the other column was Amberlite IR-1 resin (a sulfonated phenol-formaldehyde condensation product). The plutonium present in the reduced solutions was adsorbed upon the respective adsorbents with which they came in contact and the reduced plutonium was subsequently eluted from the respective adsorbents by means of a suitable eluting agent such as 1.25 N sodium acid sulphate.

It is, therefore, apparent from the example shown herein that the present invention, which comprises the introduction of an aldehyde and preferably of formaldehyde into plutonium-containing nitric acid solutions, serves a dual purpose in that the aldehyde reacts with the nitric acid thereby decomposing and removing it from solution, and also reduces the valence of plutonium contained in the original solution.

Thus, in the embodiment employing formaldehyde in a single operation and by using a single reagent which itself does not introduce further contamination, plutonium is reduced to a valence state not in excess of the tetravalent and the excess nitric acid is removed from the aqueous system thereby providing a plutonium-containing solution wherein plutonium is readily separable from other elements in said solution and can be isolated by any one of several suitable isolation processes. The process of this invention is particularly applicable to processes for separation of plutonium such as adsorption upon ion exchange resins, which process requires low acid concentrations in the solutions from which plutonium is to be adsorbed, so that dissolution of the adsorbent material by acid is obviated. Moreover in this process, plutonium in the tetravalent state is readily isolated from aqueous solutions and separable from other ions present.

It will be apparent to those skilled in the art that the process of the instant invention can be modified extensively without departing from the scope thereof. It is, therefore, understood that any such modification is to be regarded as coming within the scope of the present invention. While certain explanations and theories for the reaction have been proposed and discussed herein, it is to be strictly understood that the applicant does not wish to be bound thereby nor by any limitations other than those imposed by and shown in the appended claims.

What is claimed is:

1. A process for separating plutonium values from an aqueous nitric acid solution which contains between 35% and 50% uranyl nitrate, hexavalent plutonium and fission product values associated therewith comprising adding phosphoric acid to said solution, introducing formaldehyde into said solution at a constant rate below the surface of the solution over a time between 0.5 and 2.0 hours at a temperature of 80 to 90° C., said formaldehyde being added in sufficient amount to effect a molar ratio of approximately 1.5:1 and boiling for one hour whereby formaldehyde and excess nitric acid are destroyed and the resultant gaseous decomposition products are evolved from the solution and whereby the plutonium values contained therein are reduced to a valence state not in excess of the tetravalent and recovering said tetravalent plutonium values from aqueous solution by a suitable process.

2. The process of claim 1 wherein the reduced plutonium is recovered from the treated aqueous solution by means of adsorption of the resultant tetravalent plutonium values upon ion exchange resins.

References Cited in the file of this patent

UNITED STATES PATENTS

| | | |
|---|---|---|
| 2,785,951 | Thompson et al. | Mar. 19, 1957 |
| 2,813,004 | Wahl | Nov. 12, 1957 |

OTHER REFERENCES

Schorlemmer: The Chemistry of the Carbon Compounds, page 104, (1874), MacMillan & Co., London.

Friend: Textbook of Inorganic Chemistry, vol. 7, part 3, page 289 (1926), Charles Griffin & Co., Ltd., London.

Cohn et al.: The Use of Ion Exchangers to Effect Separation, etc., MDDC–1447, November 12, 1947, Technical Information Div., Oak Ridge, Tenn.

Mellor: Inorganic and Theoretical Chem., vol. 8, page 589 (1947), Longmans, Green & Co., London.

Harvey et al.: Journal of the Chemical Society, August 1947, pages 1010–1021.